M. URIBE.
AUTOMOBILE FENDER.
APPLICATION FILED MAR. 13, 1917.

1,226,420.

Patented May 15, 1917.
2 SHEETS—SHEET 1.

WITNESSES

INVENTOR
M. Uribe,
BY Victor J. Evans
ATTORNEY

M. URIBE.
AUTOMOBILE FENDER.
APPLICATION FILED MAR. 13, 1917.
1,226,420.
Patented May 15, 1917.
2 SHEETS—SHEET 2.
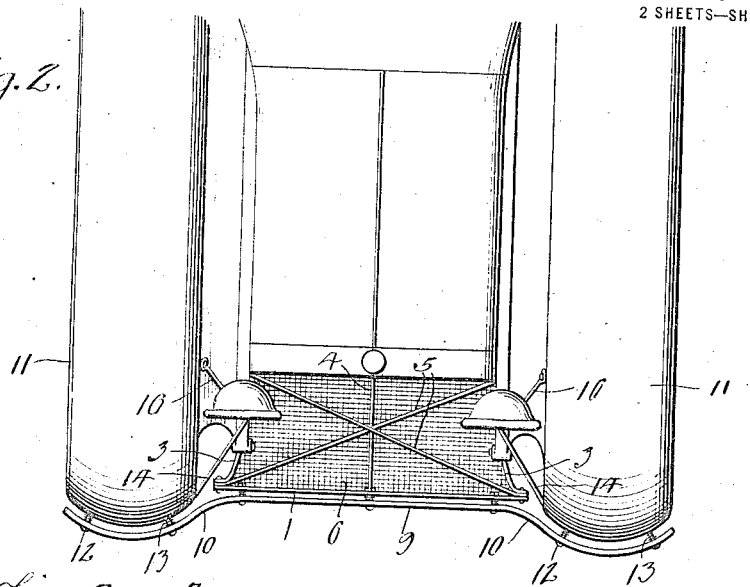
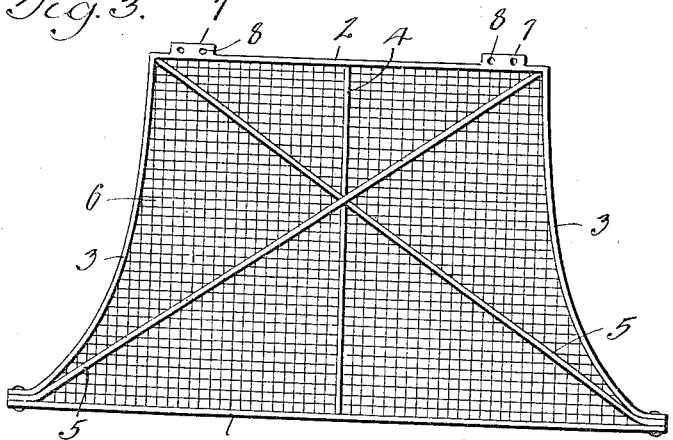
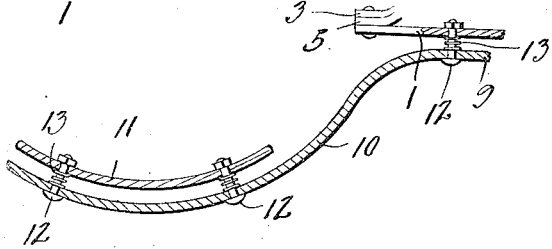
WITNESSES
INVENTOR
M. Uribe,
BY Victor J. Evans
ATTORNEY

UNITED STATES PATENT OFFICE.

MARCELINO URIBE, OF SAN ANTONIO, TEXAS.

AUTOMOBILE-FENDER.

1,226,420.

Specification of Letters Patent.  Patented May 15, 1917.

Application filed March 13, 1917. Serial No. 154,511.

*To all whom it may concern:*

Be it known that I, MARCELINO URIBE, a citizen of the United States, residing at San Antonio, in the county of Bexar and State of Texas, have invented new and useful Improvements in Automobile-Fenders, of which the following is a specification.

This invention relates to automobile fenders, the object in view being to provide a simple, reliable and effective fender which may be used in conjunction with the various types of motor vehicles now in use and which will prevent a person from being run over by the vehicle equipped with the fender, the fender forming a support for the person picked up, until the machine can be brought to a stop.

Another object in view is to so construct the fender and mount the same in relation to certain parts of the vehicle that a yieldable cushion is provided which not only prevents injury to the person struck by the fender but also has the effect of saving certain parts of the machine, particularly the front mud guards thereof.

With the above and other objects in view, the invention consists in the novel construction, combination and arrangement of parts, herein described, illustrated and claimed.

In the accompanying drawings:—

Fig. 2 is a plan view of the front portion of the vehicle showing the fender.

Fig. 3 is a detail plan view of the body of the fender detached.

Fig. 5 is a fragmentary horizontal section showing the yieldable means between the bumper, the body of the fender and the front mud guards.

Figure 1:
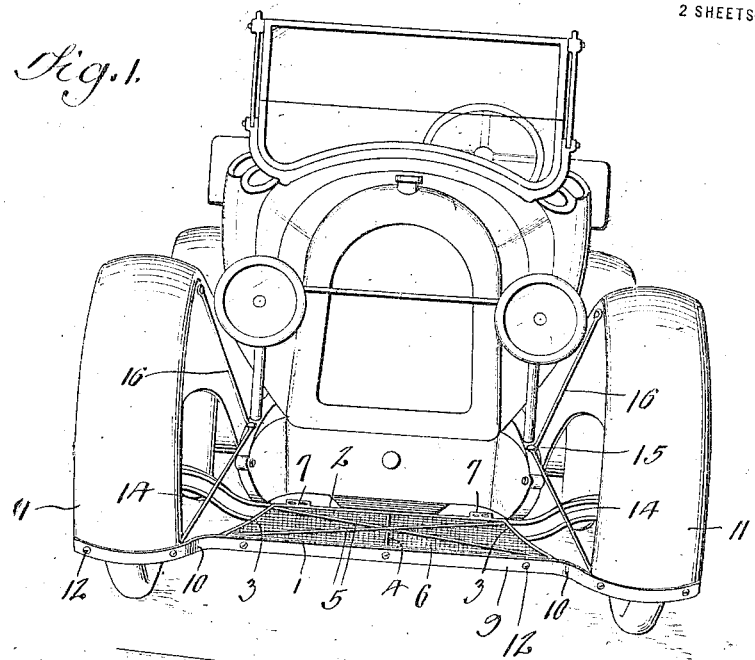
Figure 1 is a perspective view of an automobile showing the improved fender in its applied relation thereto.
Figure 4:
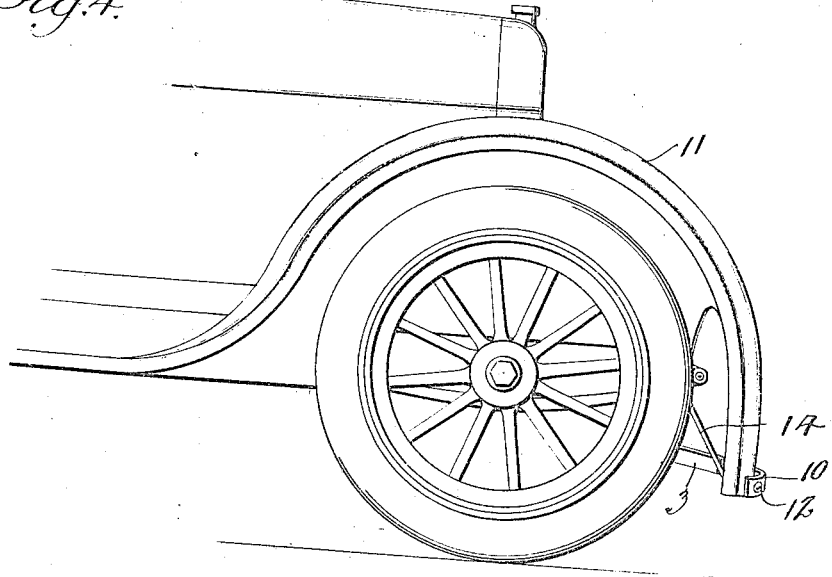
Fig. 4 is a side elevation of the front portion of the vehicle, with the fender applied.

The body of the fender contemplated in this invention comprises a marginal frame shown in Fig. 3 as consisting of the front and rear bars 1 and 2, and the curvilinear side bars 3 which diverge in a forward direction; the front bar 1 being longer than the rear bar 2. The frame also comprises a central longitudinal thrust bar 4 connected at its opposite extremities to the front and rear bars 2, and the frame further comprises diagonal braces, or bars 5 which extend between the front and rear corners of the body frame and intersect each other where they cross the central longitudinal thrust bar 4. A stout frame is thus provided, which is covered with a sheet of meshed wire 6 or the equivalent thereof. The rear cross bar 2 has attaching ears or lugs 7 extending rearwardly therefrom and formed with holes 8 adapted to receive bolts or rivets whereby the rear end of the body of the fender may be secured to the front axle of the vehicle.

The forward end of the main body or frame of the fender is supported by means of a bumper 9 having the central portion thereof straight or substantially so and extending parallel to the front bar 1 of the fender body and in spaced relation thereto for a purpose which will appear. The end portions of the bumper 9 are deflected or curved as indicated at 10 to extend across the front of the front mud guards 11, as clearly shown in Fig. 2, the end portions 10 of the bumper 9 being also in spaced relation to the forward and lower extremities of the mud guards 11. At intervals throughout the bumper 9 and the end portions 10 thereof, bolts 12 are inserted through said bumper and through the front bar 1 of the fender frame and also through the forward and lower extremities of the mud guards 11. The ends of the mud guards extend straight downwardly after curving over the front wheels and approach sufficiently close to the road surface to prevent an ordinary person from passing under the same and to insure the picking up of such person. Each of the bolts 12 is encircled by a coiled cushioning spring 13 which is interposed between the bumper 9 and the bar 1 or the mud guards 11 as the case may be. The bumper 9 serves as a resilient means for cushioning the blow necessarily given to a person before he is picked up by the fender and said bumper bar also serves as a supporting connection between the bar 1 and the mud guards 11. The forward end of the body or frame of the fender is thus partially supported by the bumper 9 which is in turn supported by the mud guards 11. Stay wires or cables 14 extend from the bumper 9 upwardly and rearwardly and are connected at 15 to fixed points on the machine frame. Other stay wires or cables 16 extend from the mud guards 11 inwardly and connect at the points 15 to the machine frame. The stays 14 assist materially in supporting the bumper 9, the lower extremities of the mud guards 11 and in that way they also serve to support the forward part of the frame or body of the fender which carries the meshed wire fabric 6.

When the fender as a whole is in its applied position in relation to the motor vehicle, it is sufficiently low to provide for the ordinary hand cranking of the motor of the vehicle, gives the necessary road clearance beneath the same, being substantially horizontal and on a level with the front axle of the vehicle, and is of sufficient extent to provide ample support for the body of a person struck and picked up by the fender.

I claim:—

The combination with a motor vehicle, of a fender comprising a substantially horizontal fender body having a stout marginal frame consisting of substantially parallel front and rear bars of unequal length, curvilinear side bars connecting the front and rear bars and diverging in a forward direction, means for securing the rear end of said frame to the front axle of the vehicle, a bumper having a portion thereof extending parallel thereto and in spaced relation to the front bar of the fender body and end portions extending in front of the front mud guards and in spaced relation thereto, yieldable means interposed between said bumper and fender body, other yieldable means interposed between the end portions of the bumper and the front mud guards, means connecting said bumper to the front mud guards and body of the fender to admit of a fore and aft yielding movement of the bumper in relation to the fender body and mud guards, and supporting stays connecting said bumper with the vehicle frame.

In testimony whereof I affix my signature.

MARCELINO URIBE.